P. E. HEBERT.
BOLL WEEVIL EXTERMINATOR.
APPLICATION FILED APR. 16, 1908.
954,629.
Patented Apr. 12, 1910.
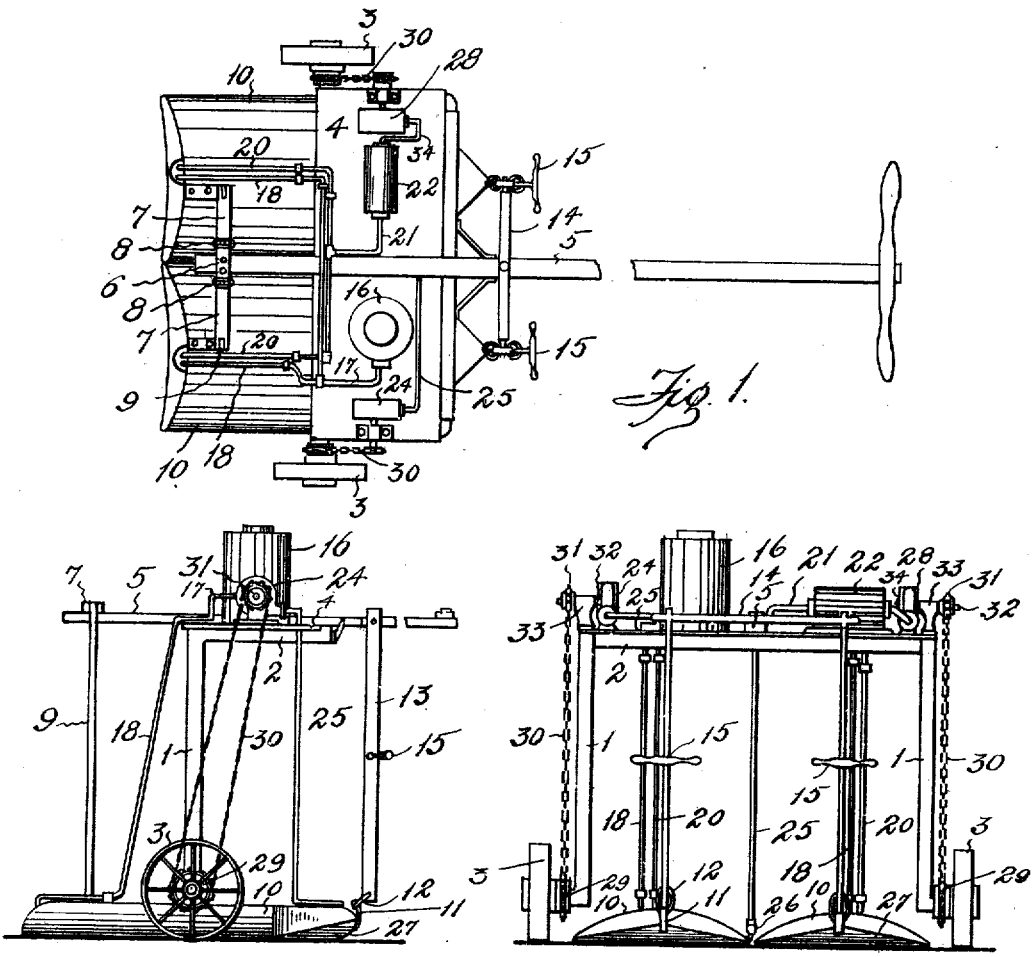
WITNESSES:
INVENTOR
Paul E. Hebert,
BY
ATTORNEY

UNITED STATES PATENT OFFICE.

PAUL E. HEBERT, OF GLENFLORA, TEXAS.

BOLL-WEEVIL EXTERMINATOR.

954,629.  Specification of Letters Patent.  Patented Apr. 12, 1910.

Application filed April 16, 1908. Serial No. 427,498.

*To all whom it may concern:*

Be it known that I, PAUL E. HEBERT, a citizen of the United States, residing at Glenflora, in the county of Wharton and State of Texas, have invented certain new and useful Improvements in Boll-Weevil Exterminators, of which the following is a specification.

My invention relates to new and useful improvements in boll weevil exterminators, and more particularly to a machine designed to destroy boll weevils, insects, and other pests by subjecting them to a certain amount of heat.

The object of the invention is to provide a machine carrying a plurality of hoods arranged to be drawn over the ground together with means for ejecting a flame into each hood.

Another feature resides in the provision of a blower to throw the weevils and insects into the path of one of the hoods so that the heat may destroy them, together with suitable means for placing the liquids under pressure.

Finally the object of the invention is to provide a device of the character described that will be strong, durable, efficient and simple and comparatively inexpensive to construct and also one in which the several parts will not be liable to get out of working order.

With the above and other objects in view, my invention has relation to certain novel features of construction and operation, an example of which is described in the following specification and illustrated in the accompanying drawings, wherein:

Figure 1 is a plan view of the machine, Fig. 2 is a side elevation, Fig. 3 is a front elevation, Fig. 4 is a plan view of one of the hoods, and Fig. 5 is a longitudinal sectional view of the hood showing the nozzle in elevation.

In the drawings, the numeral 1 designates the vertical side supports of a frame extending forwardly in a horizontal plane as indicated at 2. The supports 1 are carried by ground wheels 3, being suitably formed at their lower ends to receive the same.

The horizontal portion 2 of the frame supports a flat plate 4 suitably secured thereon and extending thereacross. A tongue 5 extends across the plate centrally of the machine and projects some distance in the rear thereof at which point, a cross bar 6 is secured. Laterally extending arms 7 project from each end of the bar and are hinged as indicated at 8 so as to swing upward but not downward below a horizontal plane. At their outer ends, these arms have pivotal connection with hangers 9 bent at their lower ends and rigidly secured to the central rear portions of hoods 10. In this way the hoods are supported to ride over the ground and are permitted to move upward upon encountering an obstruction and ride over the same. Each hood is rounded in cross section and has its bottom open but is closed at each end so as to cover the ground on all sides. At its forward end the hood is pointed and provided with a central hook 11 which has connection by a ring 12 with a vertical strap link 13, the link from each hood being pivoted at its upper end to the end of a cross tree 14 secured on the tongue 5 and projecting on each side thereof. Swingle trees 15 are suitably connected to the links 13 near their central portion. This arrangement of movable connections permits the hoods to readily rise and fall in passing over obstructions.

On the plate 4 and to one side of the center, an oil receptacle 16 is mounted, having connection by means of suitably supported and connected pipes 17 and 18 with an ejecting nozzle 19 mounted in each hood at the rear end thereof. Each nozzle also has connection by means of pipes 20 with a pipe 21 extending from a compressed air tank 22 suitably mounted on the plate 4 as shown in Figs. 1 and 3, and in which the air is compressed by means hereinafter described. The oil is thus placed under pressure and after being ignited at the nozzle 19 produces a flame which is ejected forward in each hood with considerable force and giving sufficient heat to carry out the exterminating action. At its forward end, each hood is provided with a downwardly curved deflecting plate 23 which tends to direct the flame toward the ground and to spread the heat units. Thus all insects, weevils, worms and other pests over which the hoods pass, will be destroyed by the heat, as will be apparent.

At one side of the machine, a rotary pump 24 is mounted on the plate 4 and has connection with a pipe 25 through which it forces air. This pipe extends down through the plate 4, centrally of the machine, to a blower nozzle 26 projecting between the hoods and directed toward one of the same so as to blow the pests into the path of the said hood. It will be noted that each hood is curved at its forward end, as indicated at 27, so as to readily ride over obstructions as well as fallen squares, weevils, worms, etc. A rotary pump 28 is mounted on the plate 4 on the opposite side from the pump 24. For operating these pumps sprockets 29 are connected to the ground wheels 3 so as to be revolved thereby. These sprockets are connected by upwardly extending sprocket chains 30 on the outside of each side support 1 with sprockets 31 of smaller diameter mounted on horizontal shafts 32 supported in bearing brackets 33 mounted at the sides of the plate 4. One of the shafts 32 has connection with the pump 28, while the other has connection with the pump 24. A suitably shaped pipe 34 extends from the pump 28 to the tank 22 to convey the air thereto.

It is obvious that as the machine is drawn through the field, the pumps are operated and the destroying operation continuously carried out.

As hereinbefore stated the air is compressed in the tank 22. This compressed air is conveyed to the nozzles to which the oil pipes also lead. The air being under pressure and mixing with the oil in the nozzles, a combustible mixture having considerable pressure is produced which when ignited at the nozzles will cause a strong flame to be thrown forward in each hood and which flame will be directed downward and spread at the forward end by the plate 23.

What I claim, is:

A hood for a pest exterminating machine, comprising a body rounded in cross section and having a curved forward end, and a curved deflecting plate arranged in said body.

In testimony whereof I have signed my name to this specification in the presence of two subscribing witnesses.

PAUL E. HEBERT.

Witnesses:
 WM. A. CATHEY,
 A. SCHLAFLI.